United States Patent
Ohashi et al.

(10) Patent No.: US 7,034,438 B2
(45) Date of Patent: Apr. 25, 2006

(54) VIBRATION TYPE DRIVING APPARATUS

(75) Inventors: Kaishi Ohashi, Kanagawa (JP);
Hajime Kanazawa, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 182 days.

(21) Appl. No.: 10/725,510

(22) Filed: Dec. 3, 2003

(65) Prior Publication Data

US 2004/0113518 A1 Jun. 17, 2004

(30) Foreign Application Priority Data

Dec. 13, 2002 (JP) .............................. 2002-362779

(51) Int. Cl.
*H02N 2/00* (2006.01)

(52) U.S. Cl. .................... 310/323.13; 310/323.03; 310/323.04; 310/323.08

(58) Field of Classification Search ........... 310/323.03, 310/323.04, 323.08, 323.09, 323.13, 323.14
See application file for complete search history.

(56) References Cited

U.S. PATENT DOCUMENTS

| | | | |
|---|---|---|---|
| 5,298,829 A | 3/1994 | Tsukimoto et al. | ......... 310/323 |
| 5,300,850 A | 4/1994 | Okumura et al. | ........... 310/323 |
| 5,448,127 A | 9/1995 | Kanazawa | .................. 310/323 |
| 5,632,074 A | 5/1997 | Kanazawa | ................. 29/25.35 |
| 5,739,623 A | 4/1998 | Kanazawa et al. | .......... 310/323 |
| 5,892,317 A * | 4/1999 | Mukohjima et al. | ... 310/323.03 |
| 5,973,439 A | 10/1999 | Nishio et al. | .......... 310/323.12 |
| 6,559,574 B1 | 5/2003 | Maruyama | ............. 310/323.02 |

FOREIGN PATENT DOCUMENTS

| | | |
|---|---|---|
| JP | 60-174078 | 9/1985 |
| JP | 2002-142472 | 5/2002 |

* cited by examiner

*Primary Examiner*—Thomas M. Dougherty
(74) *Attorney, Agent, or Firm*—Fitzpatrick, Cella, Harper & Scinto

(57) ABSTRACT

A vibration type driving apparatus, which is capable of increase of output torque and rotational speed without increasing the size of a vibration body, is described. The apparatus comprises a vibration body which generates vibration by supplying a driving signal to an electro-mechanical energy converting element and a contact body which contacts this vibration body and is moved by vibration received from the vibration body. The vibration body comprises a base portion having the electro-mechanical energy converting element and a plurality of vibration amplification portions for amplifying vibration generated at this base portion. Neighboring vibration amplification portions of the plurality of vibration amplification portions are connected at a position different from a connecting position of each vibration amplification portion with the base portion.

13 Claims, 14 Drawing Sheets

VIBRATION TYPE DRIVING APPARATUS

BACKGROUND OF THE INVENTION

1. Field of the Invention

The present invention relates to a vibration type driving apparatus comprising a vibration body which generates vibration by supplying a driving signal to an electro-mechanical energy converting element such as a piezoelectric element and a contact body which contacts the vibration body.

2. Description of the Related Art

Many proposals concerning a vibration type driving apparatus including an oscillatory wave motor, etc., have so far been presented.

For example, Japanese Patent Laid-Open No. S60(1985)-174078 discloses a vibration type driving apparatus provided with a disk type vibrator with a piezoelectric element, which is an electro-mechanical energy converting element, bonded to its bottom surface, wherein ring-shaped protrusions are formed on the surface of the vibrator, these ring-shaped protrusions are placed at locations of the vibrator where displacement of an oscillatory wave produced on the vibrator reaches a maximum and a rotor contacts these protrusions.

Furthermore, Japanese Patent Laid-open No. 2002-142472 discloses a vibration type driving apparatus provided with a circular ring vibrator with a piezoelectric element, which is an electromechanical energy converting element, bonded to its bottom surface, wherein when a driving signal is supplied to the piezoelectric element, standing waves with phase A and phase B of the same degree with a phase shift of 90 degrees are generated, combining these standing waves produces a traveling wave on the surface of the vibrator, the vibrator is provided with a protrusion for enlarging vibration displacement of the traveling wave and a rotor contacts these protrusions.

Furthermore, U.S. Pat. No. 6,559,574 discloses a vibration type driving apparatus provided with a vibrator with a laminated piezoelectric element fixed between two elastic bodies made of metal, etc., wherein when a driving signal is supplied to the piezoelectric element, standing waves with phase A and phase B of the same degree with a phase shift of 90 degrees are generated, combining these standing waves causes the vibrator to start oscillation, generates a primary traveling wave on the surface of the vibrator and a rotor contacts the end surface of this vibrator.

In the vibration type driving apparatus described in Japanese Patent Laid-Open No. S60(1985)-174078, a protrusion contacting the rotor is formed at a position substantially a midpoint between the center and outer edge of the vibrator where vibration displacement reaches a maximum. In this configuration, the diameter of a circle formed by contact points between the vibrator (protrusion) and the rotor becomes substantially half the diameter of the vibrator.

In this vibration type driving apparatus, the diameter of the circle formed by contact points between the vibrator and the rotor constitutes one of factors which determine the output and trying to increase the output results in an increase in the diameter of the vibrator (increase in size of the apparatus).

In contrast, in the vibration type driving apparatus described in Japanese Patent Laid-Open No. 2002-142472, the piezoelectric element and protrusion are arranged on the same circular ring, and therefore the diameter of a circle formed by contact points between the vibrator (protrusion) and rotor can be substantially equal to the diameter of the vibrator. However, compared to the size of the entire vibrator, the area occupied by the piezoelectric element is small.

On the other hand, the vibration type driving apparatus described in U.S. Pat. No. 6,559,574 has a laminated piezoelectric element fixed between two elastic bodies, and therefore the area of the laminated piezoelectric element can be relatively large compared to the size of the vibrator. Furthermore, the driving surface on which the vibrator contacts the rotor can have substantially the same outer diameter as the circumference of the vibrator. However, suppressing the natural frequency of vibration to a practical value requires the dynamic rigidity of the vibrator to be reduced and requires the length of the vibrator in the axial direction to be large to a certain extent (increase in size of the apparatus).

As shown above, the conventional vibration type driving apparatuses have difficulty in further reducing the size of the apparatus while maintaining output at a practical level.

SUMMARY OF THE INVENTION

The present invention has been made in consideration of the above situation, and has as its object to provide a vibration type driving apparatus which is capable of increase of output torque and rotational speed without increasing the size of the vibration body.

According to the present invention, the foregoing object is attained by providing a vibration type driving apparatus comprising a vibration body which generates vibration by supplying a driving signal to an electro-mechanical energy converting element and a contact body which contacts this vibration body and is driven by vibration received from the vibration body, wherein the vibrator comprises a base portion having an electro-mechanical energy converting element and a plurality of vibration amplification portions for amplifying vibration generated at the base portion and the neighboring vibration amplification portions of the plurality of vibration amplification portions are connected in the driving direction of the contact body.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

Embodiment 1

Figure 1A:
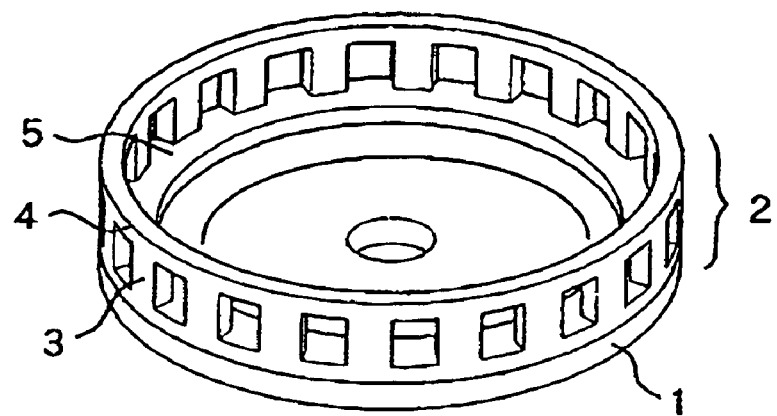
FIG. 1A and FIG. 1B show an external perspective view and a cross-sectional view of a vibrator of a vibration type driving apparatus according to Embodiment 1 of the present invention.
Figure 1B:
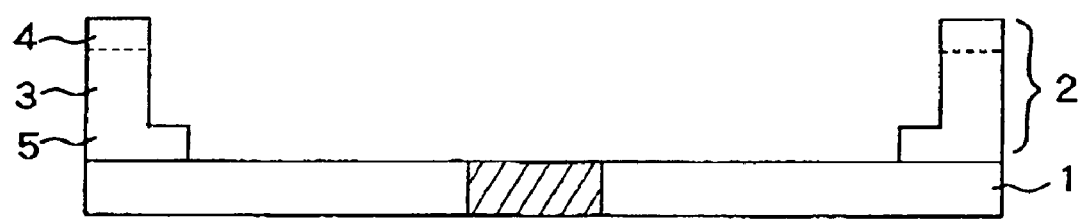

FIG. 1A and FIG. 1B show an external perspective view and cross-sectional view of a vibrator of a vibration type driving apparatus according to Embodiment 1 of the present invention.

In the same figure, reference numeral 1 denotes a base plate (base portion) of a vibrator (vibration body), which is structured by a disk-shaped elastic body made of metal, etc., and a piezoelectric element (electro-mechanical energy converting element) bonded to the entire bottom surface of this elastic body. Here, the base plate 1 may also consist of only a disk-shaped piezoelectric element.

Reference numeral 2 denotes a displacement expanding member which expands displacement of vibration excited by the base plate 1 and is made of an elastic body such as metal.

This displacement expanding member 2 is structured by a plurality of (20 in FIG. 1) columnar portions 3 (vibration amplification portions) which extends in a direction perpendicular to the plane of the base plate 1, a connection portion 4 which connects two neighboring columnar portions 3 in the circumferential direction of the base plate 1 at one end of these columnar portions, and a fixed portion 5 which is connected to the columnar portion 3 and fixed to the base plate 1 using an adhesive, etc.

The plurality of columnar portions 3 are placed on the circumference of a circle which is concentric with the base plate 1. The fixed portion 5 protrudes from the columnar portions 3 inward in the diameter direction of the base plate 1. Furthermore, the displacement expanding member 2 made up of the columnar portions 3, connection portion 4 and fixed portion 5 is formed into a single piece by, for example, cutting a single sheet of stainless steel, etc., and performing presswork on the cut sheet.

Figure 2:
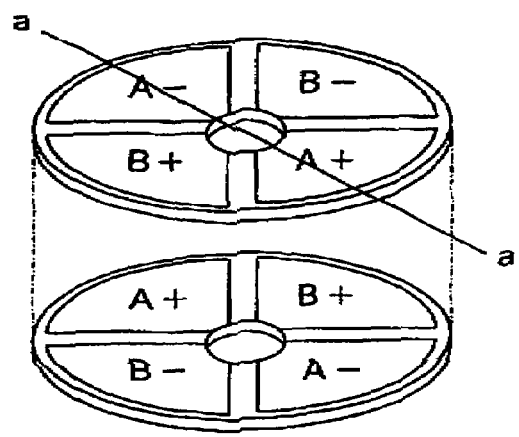
FIG. 2 illustrates an example of an electrode film formed on the vibrator.
Figure 3:
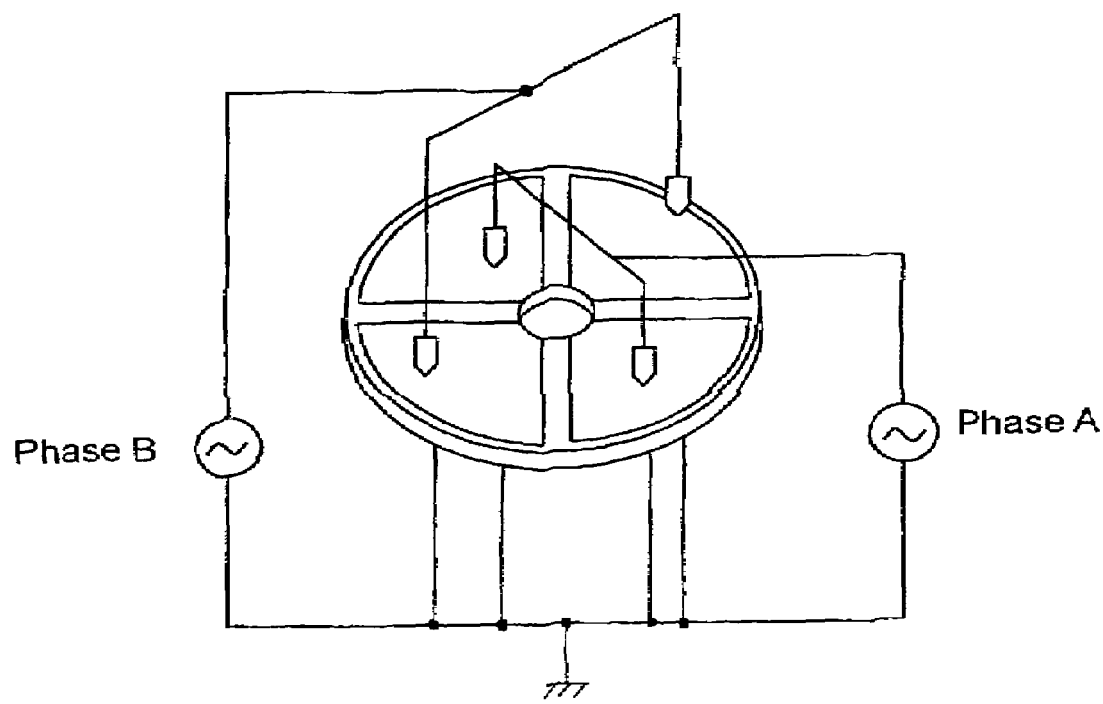
FIG. 3 illustrates an alternating voltage supplied to the vibrator on which the electrode film is formed.

As shown in FIG. 2, quadripartite electrode films are formed on both sides of the piezoelectric element, which is polarized. That is, in the upper piezoelectric element shown in FIG. 2, two neighboring electrode areas are polarized positive (+) (downward polarization) and the other two neighboring electrode areas are polarized negative (−) (upward polarization).

The lower piezoelectric element shown in FIG. 2 is also polarized in the same way as the above-described piezoelectric element. The above-described two piezo electric elements are overlapped with each other with one rotated 180 degrees from the other as shown in FIG. 2. Here, the electrode areas of vertically overlapping piezoelectric elements have mutually opposite polarizations.

Of the two overlapping piezoelectric elements, the electrode films on the surface of one piezoelectric element are grounded and the electrode films on the surface of the other are supplied with an alternating signal. Here, the electrode films A(+) and A(−) having a phase shift of 180 degrees are supplied with the same alternating signal and the other electrode films B(+) and B(−) are supplied with an alternating signal having a time phase shift of 90 degrees from that of the electrode films A(+) and A(−). This generates a standing wave with phase A and a standing wave with phase B having a phase shift of 90 degrees in the piezoelectric element.

Figure 4:
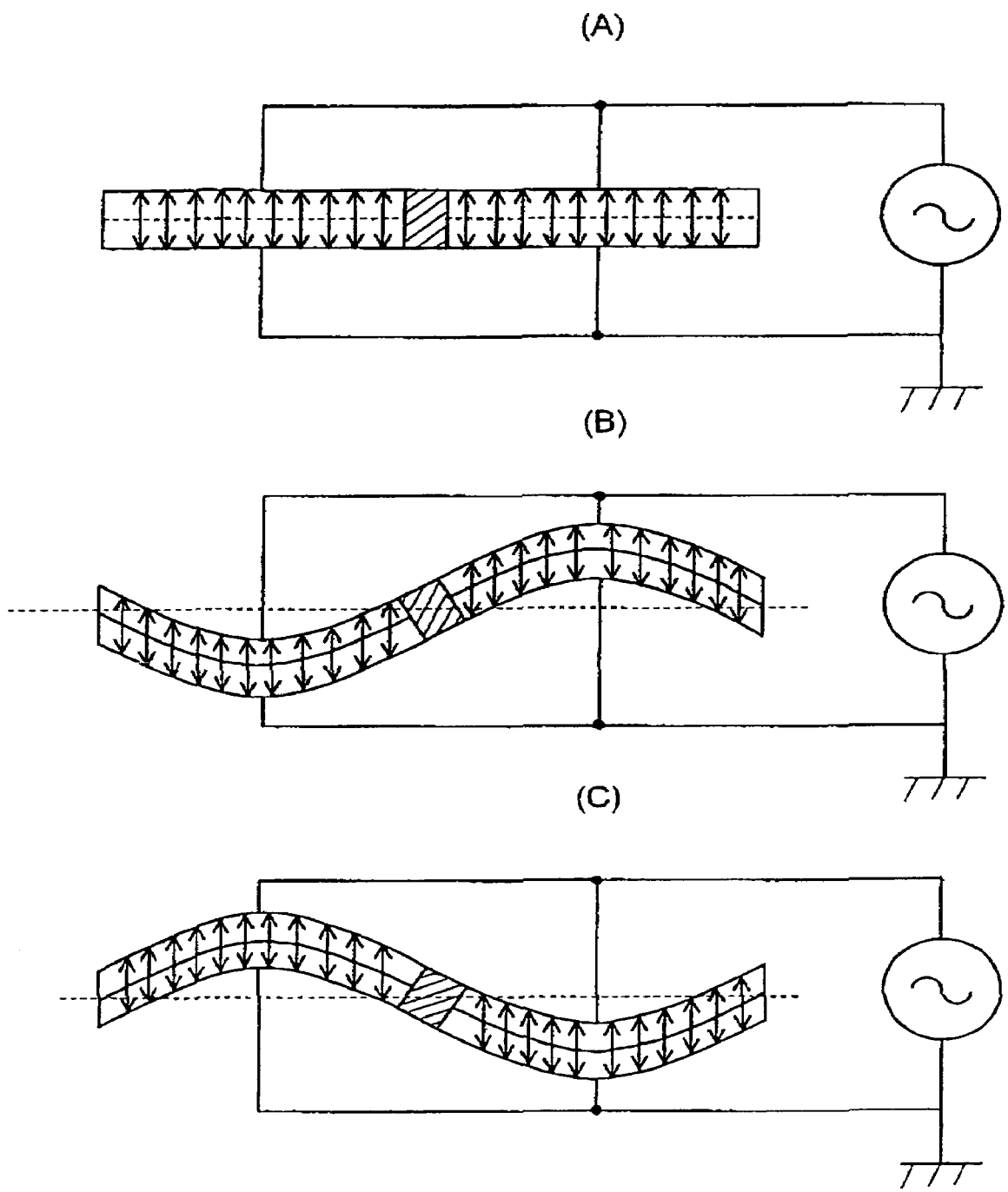
FIGS. 4(A) to (C) illustrate vibration mode produced in the vibrator on which the electrode film is formed.

FIGS. 4(A) to 4(C) show vibration modes of a standing wave (standing wave with phase A) when an alternating signal is supplied to only the electrode films A(+) and A(−). The same figure shows a cross-sectional view when the piezoelectric element shown in FIG. 2 is cut along a straight line a—a and arrows in the figure indicate polarization directions.

When an alternating voltage is supplied to the piezoelectric elements (electrode films A(+) and A(−)) in a state shown in FIG. 4(A), the polarized area of one of the vertically arranged piezoelectric elements expands and the polarized area of the other piezoelectric element contracts. This results in a state shown in FIG. 4(B). On the other hand, when the direction of the voltage supplied to the piezoelectric element is inverted, expansion and contraction in the polarized areas of the vertically arranged piezoelectric elements are switched round, which results in a state as shown in FIG. 4(C).

Thus, supplying an alternating voltage as the Dower supply to the piezoelectric elements causes the piezoelectric elements to repeat states (B)→(A)→(C)→(A)→(B), which produces a standing wave (standing wave with phase A) with secondary bending vibration. In the case of the secondary bending vibration, vibration displacement in substantially the central part of the electrode area of the piezoelectric element is largest though this depends on a dynamic rigidity distribution of the piezoelectric element and positions in which the electrode films are formed.

On the other hand, the above-described vibration mode (FIG. 4) also applies to a case where an alternating signal is supplied only to the electrode films B(+) and B(−) and a standing wave with secondary bending vibration (standing wave with phase B) is generated in the piezoelectric elements. Here, both the standing wave with phase A and standing wave with phase B have the center of the base plate 1 as their respective nodes.

Figure 5:
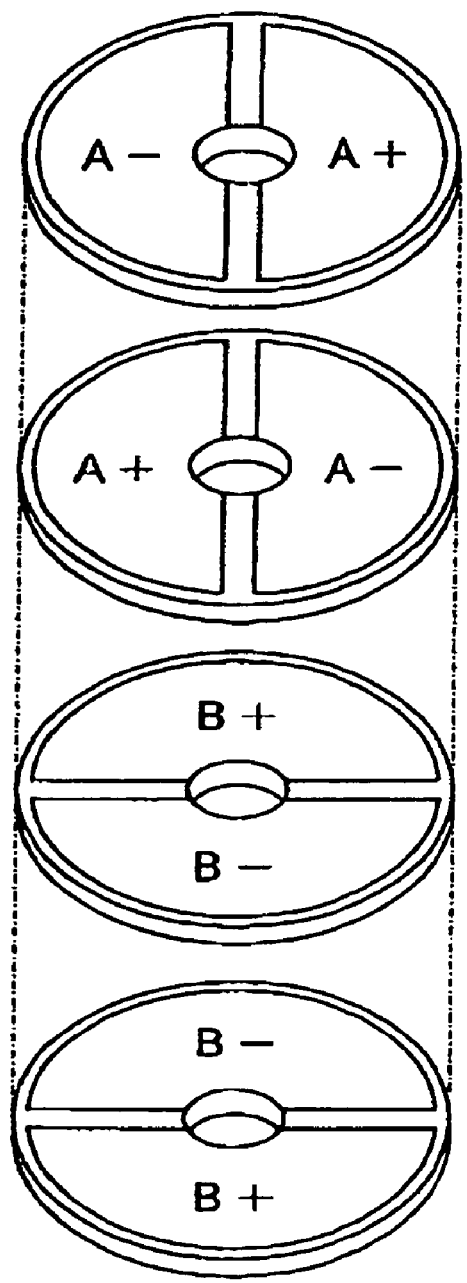
FIG. 5 illustrates another example of the electrode film formed on the vibrator.

The piezoelectric elements may also have the structure shown in FIG. 5. The piezoelectric elements explained in FIG. 2 produce the standing wave with phase A and standing wave with phase B using two piezoelectric elements, whereas the piezoelectric elements shown in FIG. 5 produce a standing wave with phase A using two upper piezoelectric elements and produce a standing wave with phase 8 using two lower piezoelectric elements.

That is, the piezoelectric elements for generating the standing wave with phase A are constructed of two overlapping upper piezoelectric elements and the piezoelectric elements for generating the standing wave with phase B are constructed of two overlapping lower piezoelectric elements. Then, as shown in FIG. 6, a grounding electrode is inserted between the upper piezoelectric elements for generating the standing wave with phase A and the lower piezoelectric elements for generating the standing wave with phase B.

Figure 6:
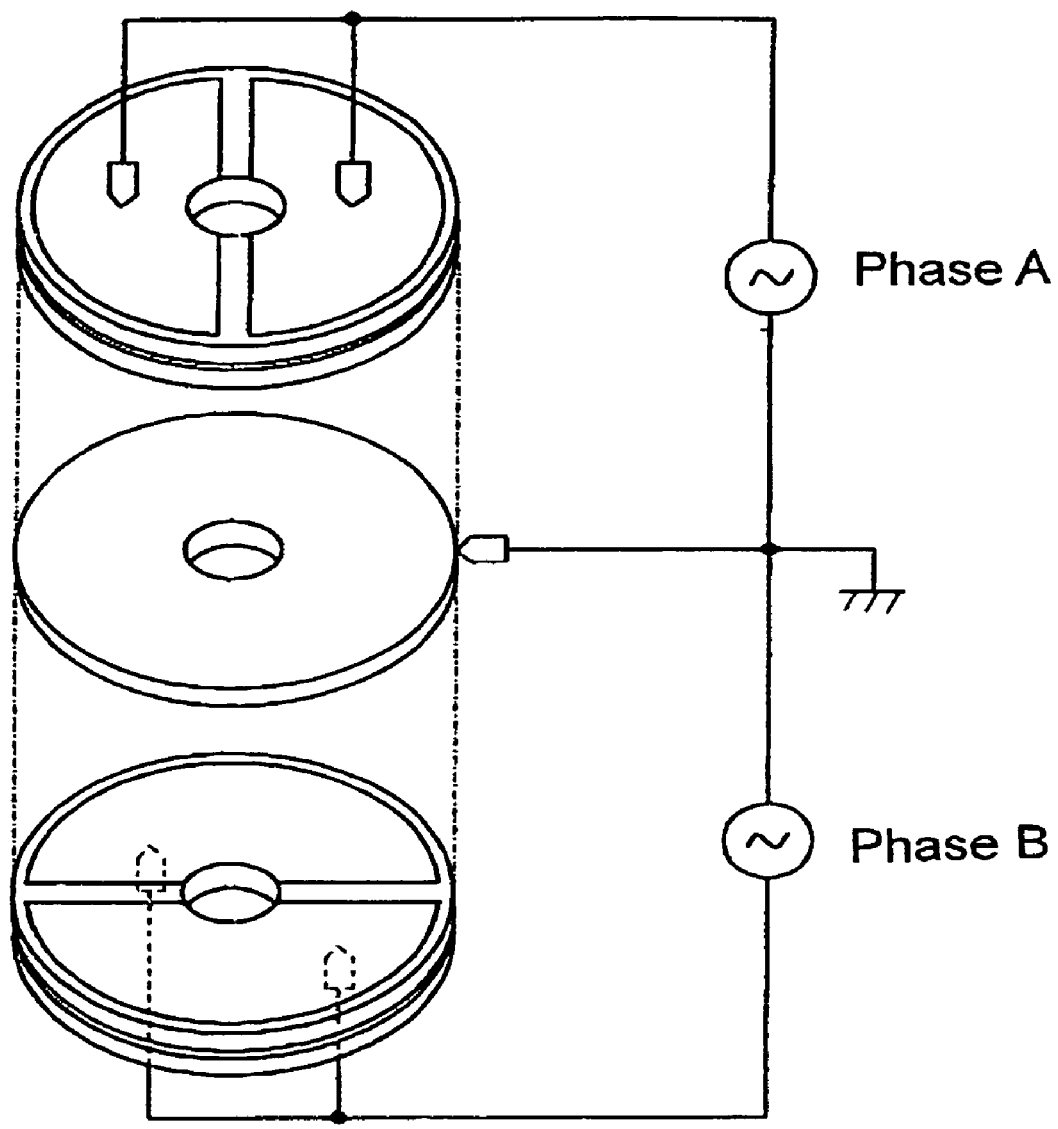
FIG. 6 illustrates an alternating voltage supplied to the vibrator on which the electrode film is formed.

In the above-described structure, the electrodes formed on the upper end surface of the upper piezoelectric elements in FIG. 6 and the electrodes formed on the lower end surface of the lower piezoelectric elements are supplied with alternating signals having a time phase shift of 90 degrees from each other. As in the case of the piezoelectric elements shown in FIG. 2, these piezoelectric elements can also generate two standing waves (standing wave with phase A and standing wave with phase B) of secondary bending vibration having a spatial phase shift (in the wavelength direction) of 90 degrees and a time phase shift of 90 degrees from each other.

As the means for supplying an alternating signal to the piezoelectric elements, a flexible substrate provided with an electrode pattern capable of supplying a voltage according to each electrode area is used and this can be fixed to the surface of the piezoelectric elements to thereby assemble the vibrator.

When a standing wave with phase A and standing wave with phase B are generated simultaneously in the piezoelectric element, a primary traveling wave which rotates in the circumferential direction is produced in the piezoelectric element. That is, vibration is generated in such a way that the vibration modes shown in FIG. 4(B) or FIG. 4(C) rotate in the circumferential direction around the center of the piezoelectric elements.

The structure of the piezoelectric elements is not limited to the above-described two structures, but any structure can be used if it can at least generate a plurality of standing waves of bending vibration by dividing the spatial phase and time phase into equal parts.

Figure 7:
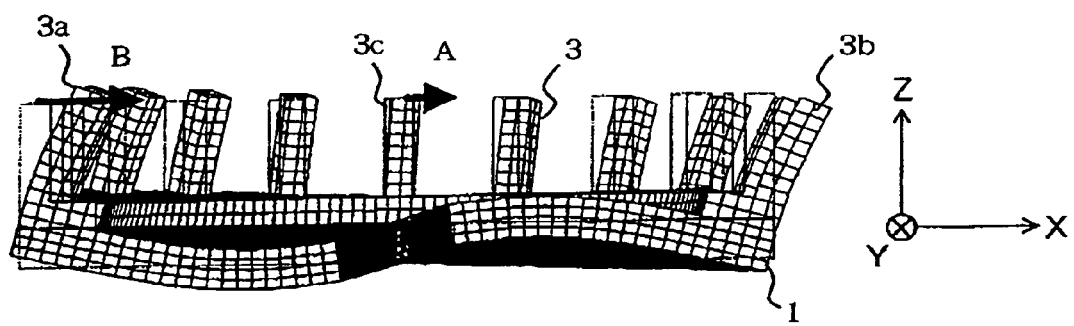
FIG. 7 illustrates a vibration mode of a vibrator whose columnar portions are not mutually connected using a finite element method.
Figure 8:
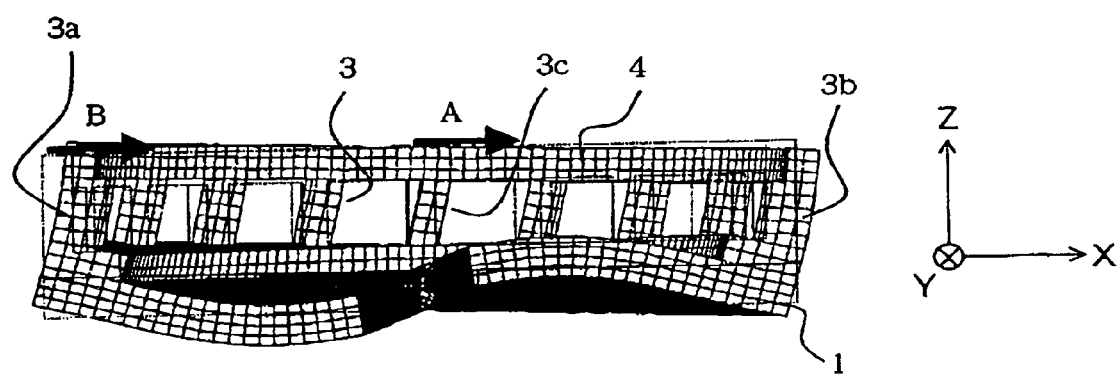
FIG. 8 illustrates a vibration mode of the vibrator of Embodiment 1 using a finite element method.

FIG. 7 illustrates a vibration mode of a vibrator having the same structure as that of this embodiment except that no connection portion 4 for connecting the columnar portions 3 is formed using a finite element method. In contrast, FIG. 8 illustrates a vibration mode of the vibrator of this embodiment provided with the connection portion 4 for connecting the columnar portions 3 using a finite element method. These figures are cross-sectional views of the respective vibrators cut by a plane passing through the diameter thereof. In these figures, the longitudinal direction of the columnar portion 3 is the Z-axis, the axis perpendicular to the Z-axis and parallel to the plane of the sheet of the figures is the X-axis and the axis perpendicular to the X-axis and Z-axis is the Y-axis.

In each vibrator (base plate 1) shown in FIG. 7 and FIG. 8, a primary traveling wave which rotates in the circumferential direction is generated and both figures show a vibration mode at a moment antinodes of the primary traveling wave are located on the cross-section in the figures. Though not shown, a rotor (contact body) is placed at the top end of the vibrator shown in FIG. 7 and FIG. 8.

In FIG. 7 and FIG. 8, substantially a midpoint between the center and outer edge of the vibrator (base plate 1) is the position of the antinode corresponding to the maximum vibration displacement of the primary traveling wave. On the other hand, the position slightly inward from the position at which the columnar portion 3 is located in the diameter direction of the base plate 1 and the central position of the base plate 1 of the vibrator are the positions of nodes corresponding to the minimum vibration displacement in the primary traveling wave.

That is, the columnar portion 3 is located at a position which satisfies the following expression (1):

$$Z(r) \times dZ(r)/dr \geq 0 \qquad (1)$$

where r is a distance from the center of the base plate 1 to the position of the columnar portion 3, $Z(r)$ is an amount of displacement of the base plate 1 in the direction perpendicular to the plane on which the vibrator contacts the rotor (Z-axis direction).

Figure 9:
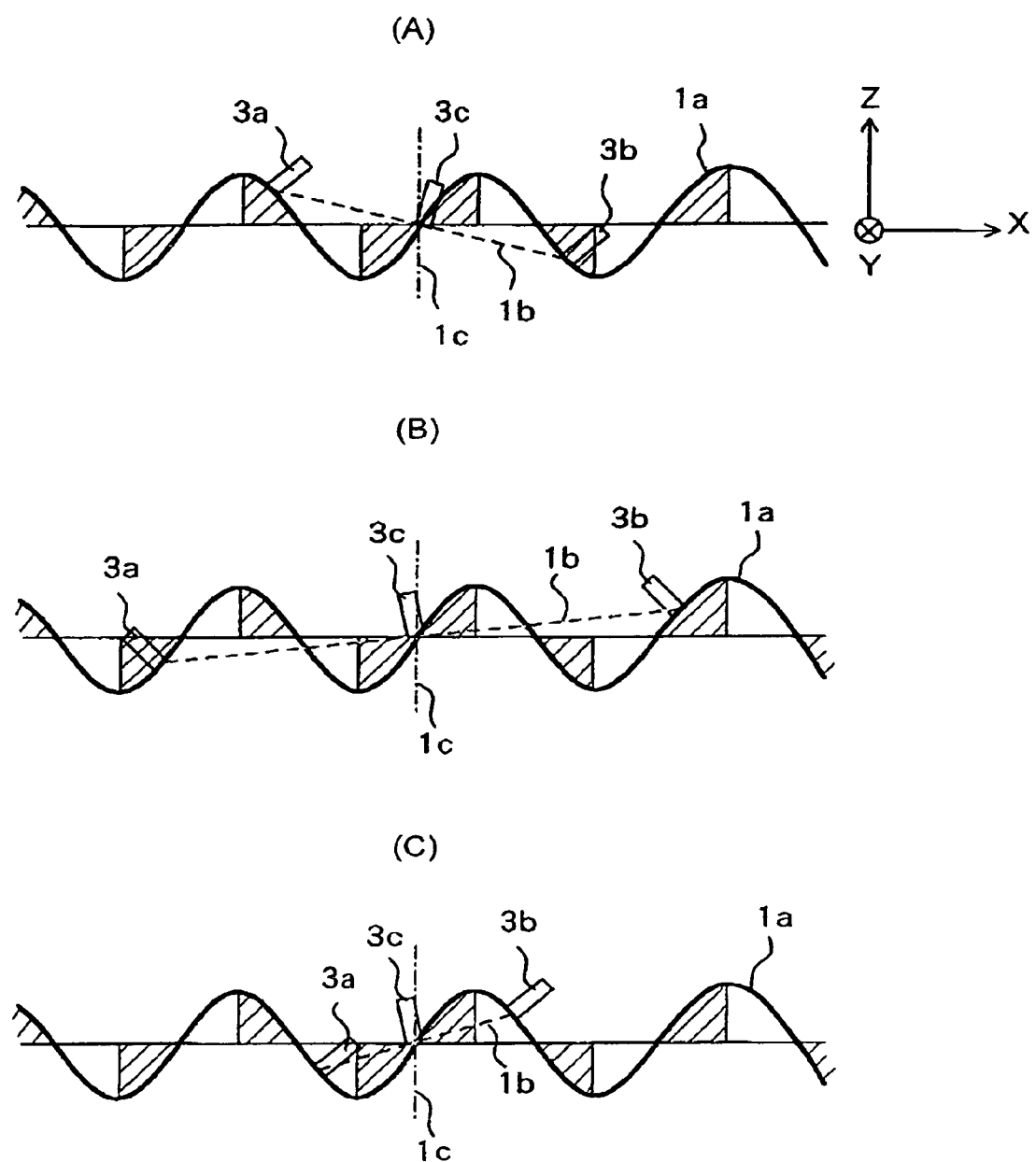
FIGS. 9(A) to (C) illustrate positions of columnar portions arranged on a base plate.

Hereafter, expression (1) will be explained more specifically using FIGS. 9(A) to (C). FIGS. 9(A) to (C) schematically show the case shown in FIG. 7 (case where there is no connection portion 4). In these figures, 1a denotes vibration displacement in a cross-section of the base plate 1 shown in FIG. 7. Of the plurality of columnar portions 3 arranged in the circumferential direction of the base plate 1, 3a and 3b correspond to the columnar portions located at both ends of the vibrator shown in FIG. 7. Of the plurality of columnar portions 3, 3c corresponds to the columnar portion in the center of the vibrator shown in FIG. 7. 1b denotes displacement (displacement on the circumference) in the Z-axis direction on the circumference of the base plate 1. 1c denotes a center line which extends in the Z-axis direction with respect to the center of the base plate 1.

Here, as shown in FIGS. 9(A) to (C), the columnar portions 3a and 3b are located at positions deviated from the node of the vibration displacement 1a and the columnar portion 3c is located at a position corresponding to the node of the vibration displacement 1a. Then, when vibration is transmitted to the base plate 1, the columnar portion 3c displaces in the direction perpendicular to the straight line of displacement 1b on the circumference.

When the columnar portions 3a and 3b are located in the area indicated with hatching of the vibration displacement 1a in the figures, the columnar portions 3a to 3c tilt in the same direction (X-axis direction) as shown in FIGS. 9(A) and 9(B). On the other hand, when the columnar portions 3a and 3b are located in the area other than hatching of the vibration displacement 1a as shown in FIG. 9(C), the columnar portions 3a and 3b tilt rightward (positive X-axis direction), but the columnar portion 3c tilts leftward (negative X-axis direction) in the figure.

Here, in the positional relationship shown in FIGS. 9(A) and 9(B), the columnar portions 3a to 3c tilt in the same direction, and if the columnar portions 3a to 3c are connected as in this embodiment (FIG. 8), the displacements of the columnar portions 3a and 3b are transmitted to the columnar portion 3c allowing the columnar portion 3c to tilt a great deal. That is, the amount of displacement at the ends of the columnar portions 3a and 3b in the X-axis direction is greater than the amount of displacement in the columnar portion 3c as shown in FIG. 7, and therefore connecting the columnar portions 3a, 3b and columnar portion 3c through the connection portion 4 allows the amount of displacement at the end of the columnar portion 3c in the X-axis direction to increase.

As will be described later, the displacement direction (the X-axis direction) at the end of the columnar portion 3c is the same as the rotation direction of the rotor, and therefore when the amount of displacement of the columnar portion 3c increases, it is possible to increase the output torque of the apparatus or increase the rotational speed of the rotor.

On the other hand, in the positional relationship of the columnar portion shown in FIG. 9(C), the columnar portion 3c tilts in the direction opposite to the direction in which the columnar portions 3a and 3b tilt, and therefore when the columnar portions 3a to 3c are connected as in this embodiment (FIG. 8), it is not possible to sufficiently reflect the amount of displacement at the ends of the columnar portions 3a and 3b in the X-axis direction in the amount of displacement of the columnar portion 3c in the X-axis direction.

Thus, the above-described expression (1) expresses the conditional expression for arranging the columnar portion 3 in the area indicated with hatching of the vibration displacement 1a in FIGS. 9(A) and (B). In other words, the columnar portion 3 is located outside in the diameter direction of the vibrator (base plate 1) with respect to the node of the vibration displacement 1a (standing wave) and located within a range of ¼ wavelength of the excited standing wave (area indicated with hatching in FIGS. 9(A) and (B)).

In FIG. 7 and FIG. 8, the end of the columnar portion 3a at the leftmost position in the figure has displaced most in the positive Z-axis direction (rotor side) This is because the base plate 1 located inside the node of the standing wave displaces in the negative Z-axis direction due to the secondary bending vibration and the columnar portion 3 located outside the node displaces in positive Z-axis direction.

At this time, the end of the columnar portion 3a contacts the rotor most strongly and pushes the rotor most strongly. On the contrary, the end of the columnar portion 3b located at the right end in the figure has displaced most in the negative Z-axis direction. Furthermore, in the states shown in FIG. 7 and FIG. 8, the ends of all the columnar portions 3 have displaced in the positive X-axis direction.

As described above, generating a primary traveling wave in the base plate 1 causes a motion describing a ellipsoidal or circular track within the plane including a tangent to the circumference of the base plate 1 and the Z-axis at the end of each columnar portion 3. This ellipsoidal or circular motion causes the columnar portion 3 to contact the rotor and rotate the rotor in such a way as to push the rotor.

Here, the difference between the driving force generated in the vibrator without the connection portion 4 (FIG. 7) and the driving force generated in the vibrator with the connection portion 4 (FIG. 8) will be explained.

In the vibrator in the state shown in FIG. 7, the ends of the columnar portions 3a and 3b have displaced most in the positive X-axis direction through secondary bending vibration. On the contrary, the end of the columnar portion 3c receives less influence of the secondary bending vibration, and so its displacement in the positive X-axis direction is smallest.

In the vibrator in the state shown in FIG. 8, one end of the columnar portion 3 is connected by the connection portion 4, and therefore displacements at the ends of the columnar portions 3a and 3b in the X-axis direction are transmitted to the end of the columnar portion 3c. Therefore, the end of the columnar portion 3c displaces in the positive X-axis direction much more than the end of the columnar portion 3c in FIG. 7.

The displacement direction (the X-axis direction) at the end of the columnar portion 3a in FIG. 8 coincides with the circumferential direction of the base plate 1, that is, the rotation direction of the rotor. Here, the end of the columnar portion 3c in FIG. 8 has displaced in the rotation direction of the rotor more than the end of the columnar portion 3c in FIG. 7. Thus, because the end of the columnar portion 3c in the figure displaces a great deal in the rotation direction of the rotor, the ends of all other columnar portions 3 connected to the columnar portion 3c are pulled in the rotation direction of the rotor and the displacement speed and angular velocity of displacement in the rotation direction of the rotor at the end of the columnar portion 3a which contacts the rotor most strongly increase.

By connecting the respective columnar portions 3 using the connection portion 4, it is possible to increase angular velocity at the end of the columnar portion 3 that contacts the rotor most strongly (columnar portion 3a in FIG. 8) and increase the rotation speed of the rotor. Furthermore, it is also possible to substantially equalize the diameter of the vibrator with the diameter of the plane on which the vibrator (displacement expanding member 2) contacts the rotor. This is because the driving efficiency can be maximized.

The effect of the connection portion 4 when the vibration mode of the vibrator is set as primary in the circumferential direction and secondary in the diameter direction will be explained below.

Figure 10:
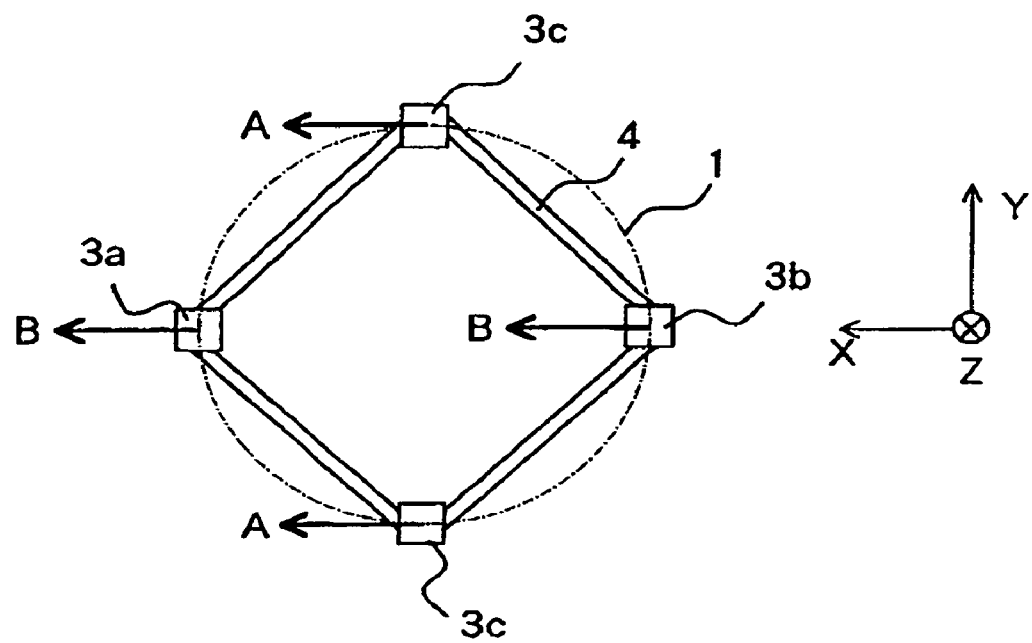
FIG. 10 illustrates vibration displacement of columnar portions when the vibration mode of the vibrator is assumed to be primary in the circumferential direction.

FIG. 10 is a top view of the vibrator of this embodiment schematically showing displacement of the columnar portion 3 when vibration which is primary in the circumferential direction and secondary in the diameter direction is produced. Of the plurality of columnar portions 3, FIG. 10 shows only columnar portions 3a, 3b and 3c in FIG. 8 and shows the connection portion 4 in a simplified manner. Furthermore, arrows A and B in the same figure show directions of vibration displacement at the columnar portions 3a to 3c.

The vibration displacement B in the same figure corresponds to the vibration displacement shown by arrow B in FIG. 8. The columnar portions 3a and 3b have displaced a great deal in the diameter direction of the vibrator which is not directly related to driving of the rotor and the directions of the vibration displacements at the columnar portions 3a and 3b are mutually opposite in the diameter direction of the vibrator (base plate 1). Then, of the plurality of the columnar portions 3, the columnar portions 3a and 3b have displaced most in the diameter direction of the vibrator.

On the other hand, vibration displacement A in FIG. 10 corresponds to the vibration displacement shown by arrow A in FIG. 8. In the vibrator (FIG. 7) without the connection portion 4, the columnar portion 3c of the plurality of columnar portions 3 displaces most in the circumferential direction of the vibrator 1 (rotation direction of the rotor). The amount of displacement of the columnar portion 3c in the circumferential direction is smaller than the amount of displacement of the columnar portions 3a and 3b in the diameter direction.

Since the columnar portion 3c is connected to the columnar portions 3a and 3b through the connection portion 4 in this embodiment, the displacements of the columnar portions 3a and 3b are transmitted to the columnar portion 3c, and the columnar portion 3c displaces a great deal in the direction indicated by arrow A in FIG. 10 (circumferential direction of the base plate 1). That is, with the vibrator of this embodiment (FIG. 8), the vibration displacement in the direction indicated by arrow A is greater than that of the vibrator without the connection portion 4 (FIG. 7).

Here, the vibration displacements A produced at the two columnar portions 3c in FIG. 10 are opposite to each other in the circumferential direction of the vibrator. However, when the vibrator is driven, standing wave vibration shown in FIG. 10 and standing wave vibration having a phase shift of 90 degrees from the above vibration are generated, and therefore the two columnar portions 3c have different displacements in the Z-axis direction and only one columnar portion 3c contacts the rotor. This causes the rotor to receive vibration from the vibrator and rotate in one direction.

Then, the effect of the connection portion 4 when the vibration mode of the vibrator in the circumferential direction is assumed to be secondary will be explained using FIG. 11. The vibration displacement B in the figure corresponds to the vibration displacement indicated by arrow B in FIG. 8. The columnar portion where vibration displacement B is generated (hereinafter referred to as "columnar portion B") has displaced a great deal in the diameter direction of the vibrator which is not directly related to the driving of the rotor and the direction of vibration displacement in the neighboring columnar portions B in the circumferential direction of the four columnar portions B in the figure are opposite to one another in the diameter direction of the vibrator (inward in the diameter direction and outward in the diameter direction). Then, of the plurality of columnar portions 3, the columnar portion B has displaced most in the diameter direction of the vibrator.

Figure 11:
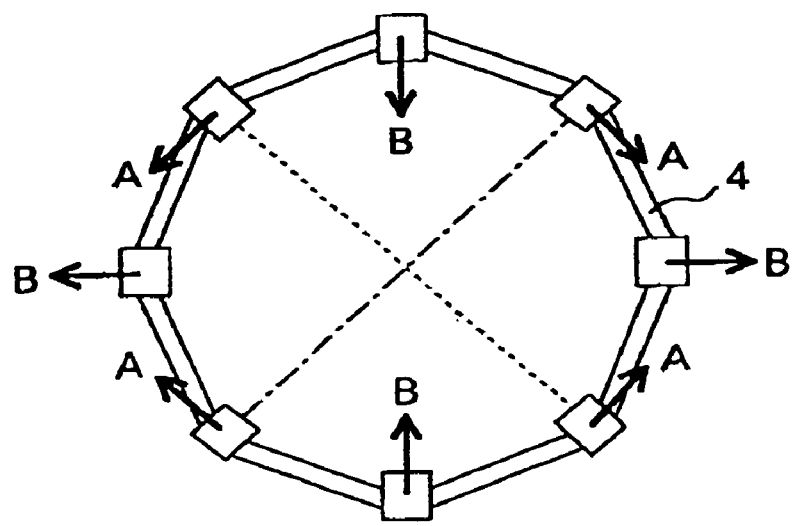
FIG. 11 illustrates vibration displacement of columnar portions when the vibration mode of the vibrator is assumed to be secondary in the circumferential direction.

On the other hand, vibration displacement A in FIG. 11 corresponds to vibration displacement indicated by arrow A in FIG. 8. In the vibrator without the connection portion 4, the columnar portion in which vibration displacement A occurs (hereinafter referred to as "columnar portion A") of the plurality of columnar portions 3 displaces most in the circumferential direction of the vibrator (rotation direction of the rotor), The amount of displacement of the columnar portion A in the circumferential direction is smaller than the amount of displacement of the columnar portion B in the diameter direction.

In FIG. 11, the columnar portion A is connected to the columnar portion B by the connection portion 4, and therefore the vibration displacement of the columnar portion B is transmitted to the columnar portion A and the columnar portion A displaces a great deal in the circumferential direction of the vibrator which becomes the rotation direction of the rotor. Then, when the vibration displacement of the columnar portion A is transmitted to the rotor, it is possible to increase the rotation speed of the rotor.

Furthermore, as shown in FIG. 11, when the vibration mode of the vibrator is assumed to be secondary in the circumferential direction, the displacement directions of four columnar portions B and the displacement directions of four columnar portions A form an angle of 45 degrees in the orthogonal coordinate system, which increases the effect of increasing the rotation speed of the rotor.

On the other hand, of the four columnar portions A shown in FIG. 11, two sets of columnar portions A which face each other sandwiching the center of the vibrator have displaced in directions opposite to each other in the circumferential direction of the vibrator. Here, when the vibrator is driven, standing wave vibration shown in FIG. 11 and standing wave vibration having a phase shift of 45 degrees from the above vibration are generated, and therefore the two sets of the columnar portions A have different vibration displacements in the Z-axis direction. Thus, only one set of columnar portions A which displace in one direction contacts the rotor. This adds the displacement in the rotation direction (one direction) to the rotor and can increase the rotation speed of the rotor.

Then, the effect of the connection portion 4 when the vibration mode of the vibrator in the circumferential direction is assumed to be tertiary will be explained using FIG. 12. The vibration displacement B in the figure corresponds to the vibration displacement indicated by arrow B in FIG. 8. The columnar portion where vibration displacement B occurs (hereinafter referred to as "columnar portion B ") has displaced a great deal in the diameter direction of the vibrator which is not directly related to the driving of the rotor and of the six columnar portions B in the figure, directions of vibration displacement of the neighboring columnar portions B in the circumferential direction are opposite to one another in the diameter direction of the vibrator (inward in the diameter direction and outward in the diameter direction). Then, of the plurality of columnar portions 3, the columnar portions B have displaced most in the diameter direction.

Figure 12:
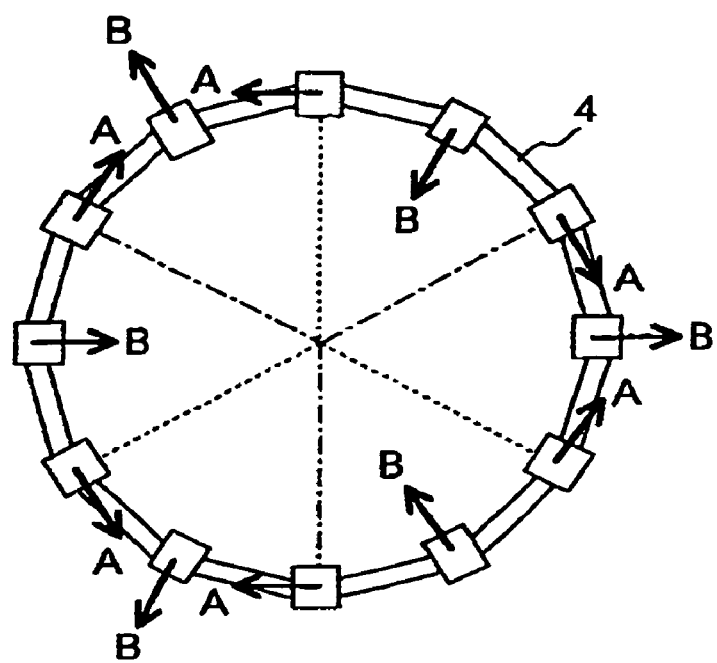
FIG. 12 illustrates vibration displacement of columnar portions when the vibration mode of the vibrator is assumed to be tertiary in the circumferential direction.

On the other hand, vibration displacement A in FIG. 12 corresponds to vibration displacement indicated by arrow A in FIG. 8. In the vibrator without the connection portion 4, the columnar portion with vibration displacement A (hereinafter referred to as "columnar portion A") displaces most in the circumferential direction of the vibrator (rotation direction of the rotor) out of the plurality of columnar portions 3. The amount of displacement of the columnar portion A in the circumferential direction is smaller than the amount of displacement of the columnar portion B in the diameter direction.

In FIG. 12, the columnar portion A is connected to the columnar portion B by the connection portion 4, and therefore the vibration displacement of the columnar portion B is transmitted to the columnar portion A, which increases the vibration displacement of the columnar portion A. This makes it possible to transmit a large force in the circumferential direction which becomes the rotation direction of the rotor to the contact surface which contacts the vibrator and thereby increase the rotation speed of the rotor.

Furthermore, as shown in FIG. 12, when the vibration mode of the vibrator is assumed to be tertiary in the circumferential direction, the displacement directions of six columnar portions B and the displacement directions of six columnar portions A form an angle of 60 degrees in the orthogonal coordinate system, which increases the effect of increasing the rotation speed of the rotor.

On the other hand, as shown in FIG. 12, the six columnar portions A consist of two sets of columnar portions A which displace in directions opposite to each other in the circumferential direction of the vibrator. The columnar portions A of each set have three columnar portions A arranged at intervals of 120 degrees in the circumferential direction of the vibrator.

Here, when the vibrator is driven, the vibration shown in FIG. 12 and vibration having a phase shift of 30 degrees from the above vibration are generated, and therefore the two sets of the columnar portions A have different vibration displacements in the Z-axis direction. Thus, only one set of columnar portions A which displace in one direction contacts the rotor. This adds the displacement in the rotation direction (one direction) to the rotor and can increase the rotation speed of the rotor.

Figure 13:
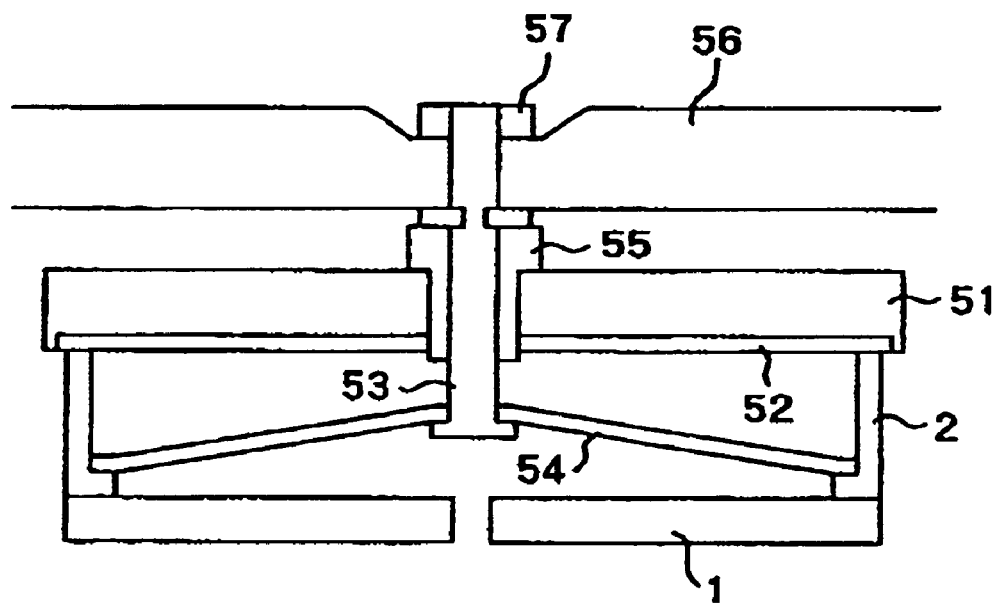
FIG. 13 is a cross-sectional view of the vibration type driving apparatus using the vibrator of Embodiment 1.

FIG. 13 shows a configuration diagram of a vibration type driving apparatus (oscillatory wave motor) provided with the vibrator according to this embodiment.

Reference numeral 51 denotes a rotor which is a contact body. 52 denotes a sliding member which is bonded to the rotor 51 and contacts the end of the displacement expanding member 2 of the vibrator. Reference numeral 53 denotes a shaft which penetrates the center of the rotor 51 and plays the role of supporting the vibrator. 54 denotes a plate spring, which is fixed to the fixed portion of the vibrator and the shaft 53 and pushes the vibrator against the sliding member 52 bonded to the rotor 51.

Reference numeral 55 denotes a bearing located between the rotor 51 and shaft 53, which supports the rotor 51 to the shaft 53 in a rotatable manner. 56 denotes a base plate which fixes the vibration type driving apparatus. 57 denotes a nut and fastening the nut 57 to the end of the shaft 53 causes the shaft 53 to be fixed to the base plate 56.

When an alternating signal is supplied from a power supply (not shown) to the base plate 1 (piezoelectric element) of the vibrator, the above-described primary traveling wave is generated at one end of the displacement expanding member 2. Here, since the displacement expanding member 2 is pressed against the sliding member 52 by the plate spring 54, the rotor 51 rotates by receiving vibration (traveling wave) from the displacement expanding member 2 through friction between the displacement expanding member 2 and sliding member 52.

The vibrator of the vibration type driving apparatus which is another embodiment of the present invention will be explained below. The embodiment explained below will focus on a configuration different from that of the vibrator (FIG. 1) explained in Embodiment 1.

Figure 14:
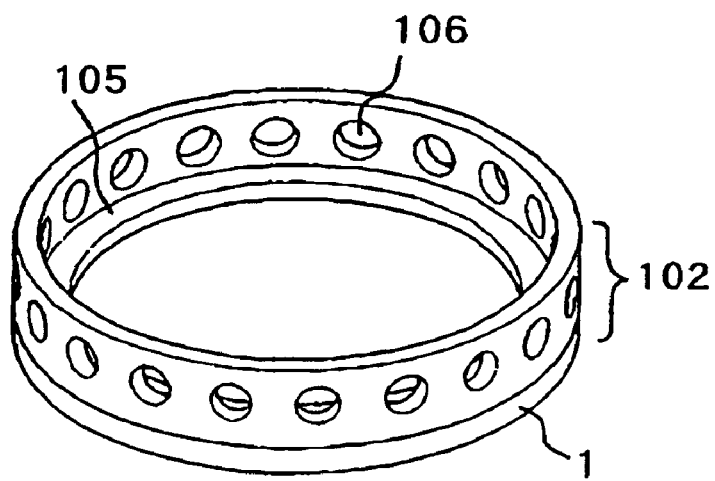
FIG. 14 is an external perspective view of a vibrator of a vibration type driving apparatus according to Embodiment 2 of the present invention.

FIG. 14 shows an external perspective view of a vibrator of a vibration type driving apparatus according to Embodiment 2 of the present invention. Here, the same members as those explained in Embodiment 1 are assigned the same reference numerals and explanations thereof will be omitted.

A displacement expanding member 102 of the vibrator (vibration body) shown in FIG. 14 is cylinder-shaped and provided with round holes 106 at substantially uniform intervals in the circumferential direction thereof. By forming the round holes 106 in the cylinder-shaped member, the vibrator of this embodiment is provided with the same functions as those of the columnar portions and connection portion explained in Embodiment 1. That is, a portion located between two neighboring round holes 106 in the circumferential direction of the displacement expanding member 102 has the function as the columnar portions, and the portion above the round holes 106 in the figure has the function as the connection portion.

A fixed portion 105 which extends inward in the diameter direction of the vibrator is formed at one end of the displacement expanding member 102 and this fixed portion 105 is fixed to the base plate 1 by means of an adhesive, etc.

In the displacement expanding member 2 according to Embodiment 1, the columnar portions 3 and connection portion 4 have flat sides, but the columnar portions and connection portion can also have curved surfaces as in this embodiment. Here, the positions at which columnar portions are placed on the base plate 1 and the vibration mode of the vibrator are the same as those explained in Embodiment 1.

Since two columnar portions arranged side by side in the circumferential direction of the vibrator are mutually connected in this embodiment, too, it is possible to have the same effect as that of Embodiment 1, that is, increasing the rotation torque and rotation speed of the rotor. Furthermore, when the displacement expanding member 102 in this embodiment is formed, only round holes 106 are formed in the cylindrical member, and therefore processing is easier than forming the displacement expanding member 2 in Embodiment 1.

Embodiment 3

Figure 15:
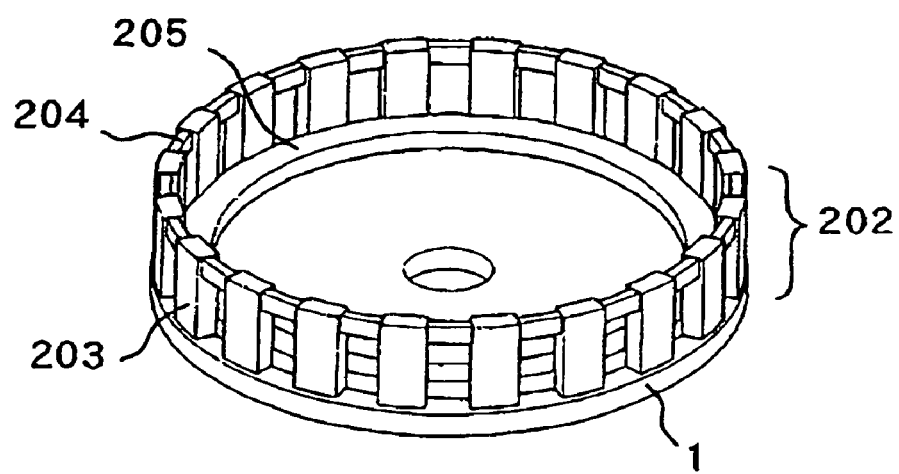
FIG. 15 is an external perspective view of a vibrator of a vibration type driving apparatus according to Embodiment 3 of the present invention.

FIG. 15 shows an external perspective view of a vibrator of a vibration type driving apparatus according to Embodiment 3 of the present invention. Here, the same members as those explained in Embodiment 1 are assigned the same reference numerals and explanations thereof will be omitted. Moreover, the positions at which columnar portions are arranged on a base plate 1 and the vibration mode of the vibrator in this embodiment are the same as those explained in Embodiment 1.

In a displacement expanding member 202 of the vibrator shown in FIG. 15, columnar portions (vibration amplification portions) 203 which extend in a direction perpendicular to the plane of the base plate 1 are connected to the circumference of a ring-shaped fixed portion 205. Then, one end of the columnar portion 203 and a fixed portion 205 are fixed to the base plate 1. On the other hand, a connection portion 204 is provided between the two neighboring columnar portions 203 in the circumferential direction of the vibrator (base plate 1), which connects between the other ends of the two columnar portions 203.

Two columnar portions 203 arranged side by side in the circumferential direction of the vibrator are connected by a connection portion 204 in this embodiment, too, and therefore it is possible to obtain the same effect as that of Embodiment 1, that is, increasing rotation torque or rotation speed of the rotor. Moreover, according to the configuration of the vibrator of this embodiment, it is possible to further increase the rotation torque or rotation speed of the rotor.

That is, the vibrator of this embodiment is provided with the fixed portion 205 inside the columnar portion 203, and can thereby reduce mechanical rigidity in the connection portion between the columnar portion 203 and base plate 1 compared to the vibrator of Embodiment 1 in which case the fixed portion 5 is provided at the same position as the columnar portions 3 in the diameter direction of the vibrator. This increases the amount of displacement of the columnar portions 203 in the diameter direction of the vibrator, and can thereby increase the amount of displacement of the columnar portion 203 which displaces in the circumferential direction of the vibrator through the connection portion 204 and increase rotation torque or rotation speed of the rotor.

Embodiment 4

Figure 16:
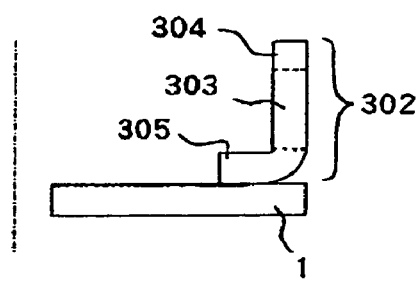
FIG. 16 is a partial cross-sectional view of a vibrator of a vibration type driving apparatus according to Embodiment 4 of the present invention.

FIG. 16 shows a partial perspective view of a vibrator of a vibration type driving apparatus according to Embodiment 4 of the present invention. Here, the same members as those explained in Embodiment 1 are assigned the same reference numerals and explanations thereof will be omitted. Moreover, the positions at which columnar portions are arranged on a base plate 1 and the vibration mode of the vibrator in this embodiment are the same as those explained in the first embodiment.

The vibrator in this embodiment has substantially the same shape as that of the vibrator of Embodiment 1, columnar portions (vibration amplification portions) 303 are arranged side by side in the circumferential direction of the base plate 1 and a connection portion 304 which connects two neighboring columnar portions 303 is provided between the two columnar portions 303 arranged side by side in this circumferential direction. Furthermore, a fixed portion 305 is provided at the other end of the columnar portion 303 and this fixed portion 305 is fixed to the base plate 1 by means of an adhesive, etc.

On the other hand, this embodiment differs from Embodiment 1 in the shapes of the columnar portion 303 and fixed portion 305. That is, the part of the columnar portion 303 and fixed portion 305 which connects with the base plate 1 is R-shaped.

Adopting the above-described shape for the columnar portion 303 and fixed portion 305 can reduce mechanical rigidity in the connection part of the columnar portion 303 and fixed portion 305 with the base plate 1. As in the case of Embodiment 3, this makes it possible to increase the amount of displacement of the columnar portion 303 and increase the rotation torque or rotation speed of the rotor.

Embodiment 5

Figure 17:
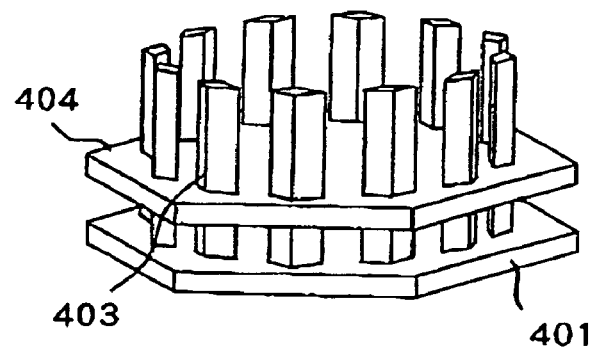
FIG. 17 is an external perspective view of a vibrator of a vibration type driving apparatus according to Embodiment 5 of the present invention.

FIG. 17 shows an external perspective view of a vibrator of a vibration type driving apparatus according to Embodiment 5 of the present invention.

The vibrator of this embodiment is formed in a hexagon tabular shape, comprises a base plate (base portion) 401 made of piezoelectric ceramics and twelve columnar portions 403 having a rectangular cross section are fixed to the surface of this base plate 401. These columnar portions 403 are arranged side by side in such a way as to describe a circle.

Furthermore, a hexagon tabular shaped connection portion 404 is connected in the middle (for example, the center) in the longitudinal direction of the columnar portion (vibration amplification portion) 403. The above-described embodiment provides a connection portion at one end of the columnar portion, but it is also possible to provide the connection portion 404 at a location other than one end of the columnar portions 403 as in the case of this embodiment. That is, two neighboring columnar portions 403 in the circumferential direction of the vibrator are connected by the connection portion 404, and therefore the same effects as those of the above-described embodiments can be obtained.

The position in the columnar portions 403 at which the connection portion 404 is provided can be any position different from one end of the columnar portions 403 fixed to the base plate 401 which at least allows the columnar portions 403 to be mutually connected. However, since displacement at the other end (side opposite to the side connected to the base plate 401) becomes largest, as the connection portion 404 is provided closer to the other end of the columnar portion 403, greater displacement of the columnar portion 403 can be transmitted to other columnar portions 403 and increase the rotation steed of the rotor.

When, for example, a plurality of base plates are cut from one rectangle-shaped piezoelectric ceramics, a hexagonal base plate as in the case of this embodiment can reduce waste of material more than a circular one. The positions at which columnar portions 403 are arranged on the base plate 401 and the vibration mode of the vibrator are the same as those explained in Embodiment 1.

Embodiment 6

Figure 18:
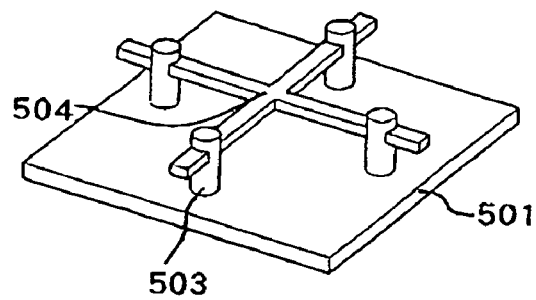
FIG. 18 is an external perspective view of a vibrator of a vibration type driving apparatus according to Embodiment 6 of the present invention.

FIG. 18 shows an external perspective view of a vibrator of a vibration type driving apparatus according to Embodiment 6 of the present invention.

The vibrator according to this embodiment is formed in a rectangular tabular shape and provided with a base plate (base portion) 501 made of piezoelectric ceramics and four cylindrical columnar portions (vibration amplification portions) 503 are fixed to the surface of this base plate 501. These columnar portions 503 are placed at substantially the same intervals on the same circumference. Furthermore, a connection portion 504 is connected at one end of the columnar portions 503. This connection portion 504 is formed in a cross shape at the center of the four columnar portions 503.

Since two neighboring columnar portions 503 in the circumferential direction are connected through the connection portion 504 in this embodiment, too, it is possible to increase displacement of the columnar portions 503 as in the above-described embodiments and thereby increase the rotation speed of the rotor. Furthermore, the structure of this embodiment can increase the rotation speed of the rotor with such a small number of parts as four columnar portions 503. The positions at which the columnar portions 503 are arranged on the base plate 501 and the vibration mode of the vibrator are the same as those explained in Embodiment 1.

Embodiment 7

Figure 19A:
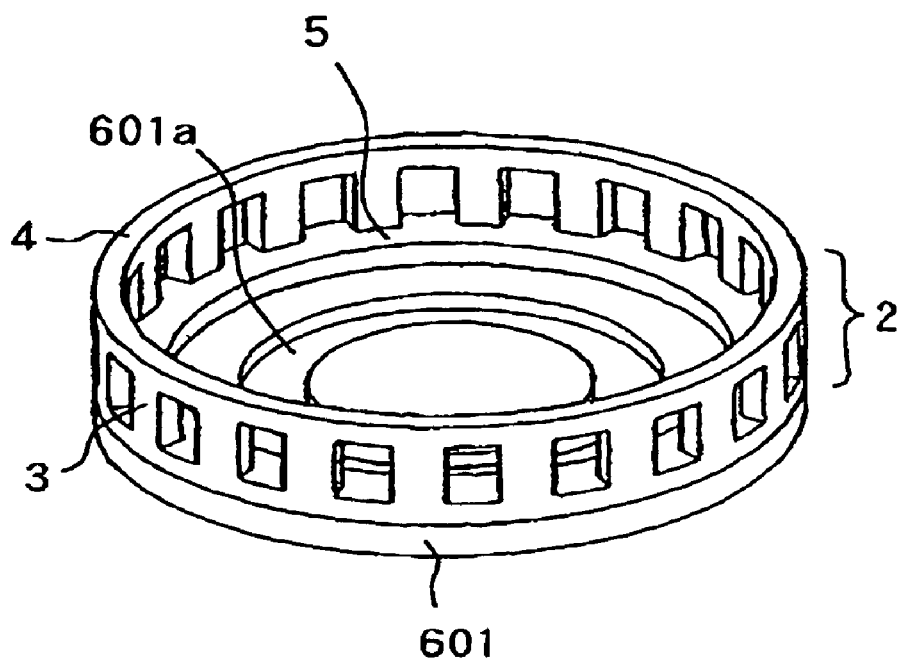
FIG. 19A and FIG. 19B show an external perspective view and partial cross-sectional view of a vibrator of a vibration type driving apparatus which is Embodiment 7 of the present invention.
Figure 19B:
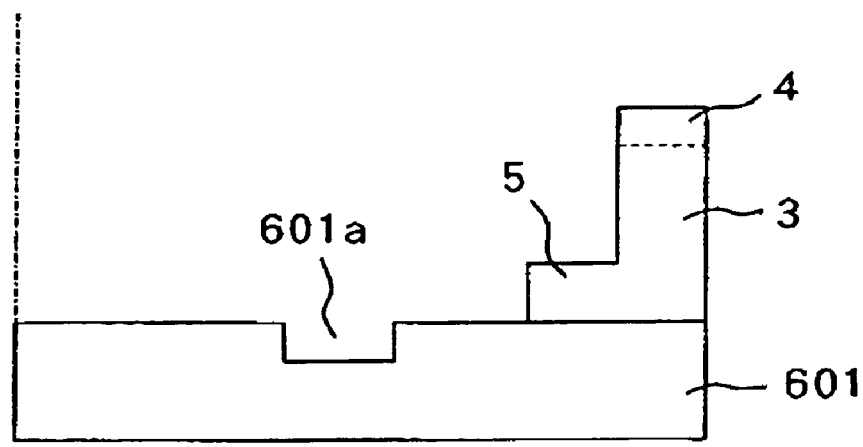

FIG. 19A and FIG. 19B show an external perspective view and a partial cross-sectional view of a vibrator of a vibration type driving apparatus according to Embodiment 7 of the present invention.

The vibrator of this embodiment is different from the vibrator of Embodiment 1 in the structure of the base plate and the rest of the structure (displacement expanding member) is the same as that of Embodiment 1. Here, the same members as those explained in Embodiment 1 are assigned the same reference numerals and explanations thereof will be omitted.

In this embodiment, no through hole is provided in the center of the base plate (base portion) 601 and a concave portion 601a which extends in the circumferential direction is formed on one side of the base plate 601. Forming the concave portion 601a reduces rigidity of the base plate 601, and can thereby reduce the natural frequency of the vibrator.

When the natural frequency of the vibrator is high, unnecessary vibration is likely to occur due to the resultant of an excitation force from the piezoelectric element and an excitation force from the rotor which contacts under pressure. Since this unnecessary vibration may cause so-called noise on, the natural frequency of the vibrator is preferably low. Furthermore, by reducing rigidity of the base plate 601, it is also possible to increase the amplitude of the displacement expanding member 2 and increase the driving efficiency of the rotor.

Here, forming the concave portion 601a at a position corresponding to the antinode of the amplitude of a traveling wave generated at the base plate 601 is most effective in increasing the amplitude of the displacement expanding member 2. If the vibration mode of vibration generated at the base plate 601 is the vibration mode shown in FIG. 1, the position at which the concave portion 601a is formed is in substantially the center between the base plate 601 and circumference.

Since this embodiment includes the displacement expanding member 2 which is the same as Embodiment 1, it is possible to increase displacement of the columnar portion 3 as in the case of Embodiment 1 and increase the rotation speed of the rotor. This embodiment forms the recessed portion (601a) in the vibrator of Embodiment 1, but it is also possible to form the recessed portion explained in this embodiment in the vibrator of other embodiments (Embodiment 2 to Embodiment 6). The positions at which displacement expanding members (columnar portions) are arranged on the base plate 601 and the vibration mode of the vibrator are the same as those explained in Embodiment 1.

Embodiment 8

Figure 20:
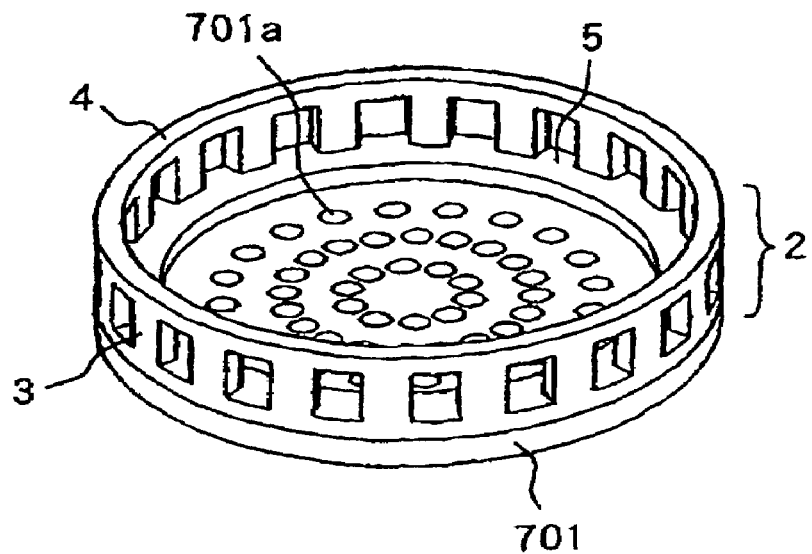
FIG. 20 is an external perspective view of a vibrator of a vibration type driving apparatus according to Embodiment 8 of the present invention.

FIG. 20 shows an external perspective view of a vibrator of a vibration type driving apparatus according to Embodiment 8 of the present invention.

The vibrator of this embodiment is different from the vibrator of Embodiment 1 in the structure of the base plate and the rest of the structure (displacement expanding member) is the same as that of Embodiment 1. Here, the same members as those explained in Embodiment 1 are assigned the same reference numerals and explanations thereof will be omitted.

A base plate (base portion) 701 is formed in a disk shape and constructed of an elastic body made of metal, etc., and a piezoelectric element bonded to the back of the elastic body. In this embodiment, no through hole is provided in the center of the base plate 701 and through holes 701a each having a predetermined diameter are formed side by side concentrically. As in the case of Embodiment 7, this embodiment can reduce rigidity of the base plate 701 and thereby increase the amplitude of the displacement expanding member 2 and thereby improve the driving efficiency of the rotor. Moreover, this embodiment can reduce the natural frequency of the vibrator and thereby prevent unnecessary vibration of the vibrator from occurring.

Since this embodiment is provided with the displacement expanding member 2 according to Embodiment 1, it is possible to increase displacement of the columnar portions 3 as in the case of Embodiment 1 and increase the rotation speed of the rotor. Furthermore, this embodiment forms a plurality of through holes (701a) in the vibrator (base plate) of Embodiment 1, but it is also possible to form the through holes explained in this embodiment in the vibrator of other embodiments (Embodiment 2 to Embodiment 6). Furthermore, the positions at which displacement expanding members (columnar portions) are arranged on the base plate 701 and the vibration mode of the vibrator are the same as those explained in Embodiment 1.

Embodiment 9

Figure 21:
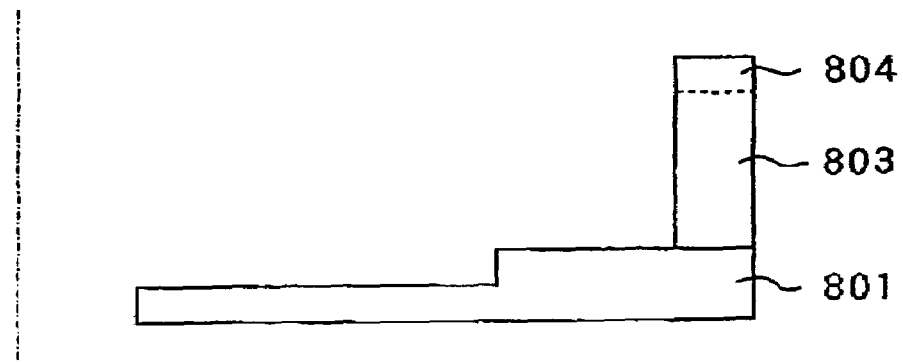
FIG. 21 is a partial cross-sectional view of a vibrator of a vibration type driving apparatus according to Embodiment 9 of the present invention.

FIG. 21 shows a partial cross-sectional view of a vibrator of a vibration type driving apparatus according to Embodiment 9 of the present invention.

A base plate (base portion) 801 in this embodiment is formed in a disk shape and constructed by an elastic body made of metal, etc., and a piezoelectric element bonded to the back of the elastic body. Columnar portions (vibration amplification portions) 803 which extend in a direction perpendicular to the plane of the base plate 801 are directly fixed to the surface of the base plate 801. The columnar portions 803 are arranged side by side in the circumferential direction of the base plate 801 and a connection portion 804 which connects one end of the two neighboring columnar portions 803 in the circumferential direction is provided between them.

The base plate 801 is formed in such a way that this central area is thinner than other areas and the central area is formed up to the position including the antinode of a traveling wave generated at the base plate 801.

According to the structure of the vibrator of this embodiment, two neighboring columnar portions 803 in the circumferential direction of the vibrator are connected by the connection portion 804 at their one end, Therefore, it is possible to increase displacement of the columnar portions 803 as in the case of Embodiment 1 and increase the rotation speed of the rotor.

Furthermore, since the columnar portions 803 are directly connected to the base plate 801, mechanical rigidity in the connecting part between the columnar portions 803 and base plate 801 can be reduced. This makes it possible to achieve the same effects as those in the above-described Embodiment 3 and Embodiment 4. Furthermore, the central area of the base plate 801 is formed thinner up to the position including the antinode of the traveling wave than other areas, and therefore it is possible to reduce rigidity of the base plate 801 and reduce the natural frequency of the vibrator. This makes it possible to achieve the same effects as those in Embodiment 7 and Embodiment 8.

Furthermore, the positions at which the columnar portions 803 are arranged on the base plate 801 and the vibration mode of the vibrator are the same as those explained in Embodiment 1.

Embodiment 10

Figure 22:
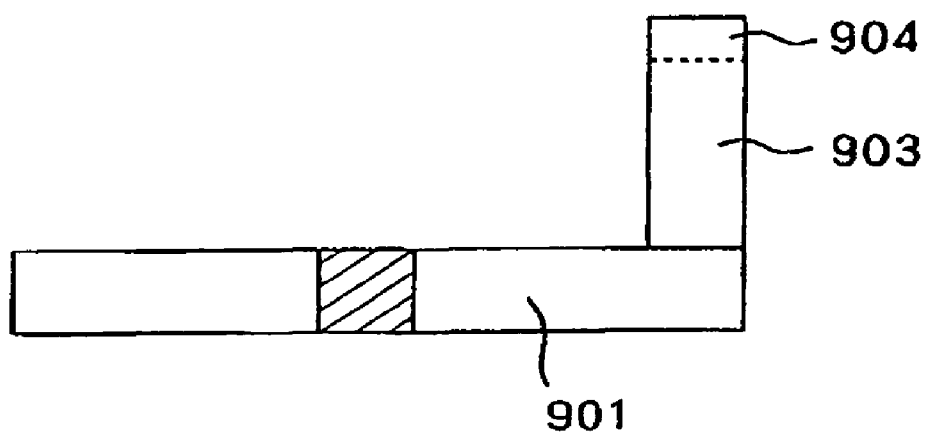
FIG. 22 is a partial cross-sectional view of a vibrator of a vibration type driving apparatus according to Embodiment 10 of the present invention.

FIG. 22 shows a partial cross-sectional view of a vibrator of a vibration type driving apparatus according to Embodiment 10 of the present invention.

A base plate (base portion) 901 is formed in a disk shape and constructed by an elastic body made of metal, etc., and a piezoelectric element bonded to the back of the elastic body. Columnar portions (vibration amplification portions) 903 which extend in a direction perpendicular to the plane of the base plate 901 are directly fixed to the surface of the base plate 901. The columnar portions 903 are arranged side by side in the circumferential direction of the base plate 901 and a connection portion 904 which connects one end of the two neighboring columnar portions 903 in the circumferential direction is provided between them.

The base plate 901 is formed in such a way that the area corresponding to the antinode of a traveling wave (area with hatching in the figure) is made of a material of smaller rigidity than other areas.

According to the vibrator of this embodiment, two neighboring columnar portions 903 in the circumferential direction of the vibrator are connected by the connection portion 904 at their one end. Therefore, it is possible to increase displacement of the columnar portion 903 as in the case of Embodiment 1, and thereby increase the rotation speed of the rotor.

Furthermore, the columnar portions 903 are directly fixed to the base plate 901, and therefore it is possible to reduce mechanical rigidity in the connecting part between the columnar portions 903 and base plate 901. This makes it possible to achieve the same effects as those in the above-described Embodiment 3 and Embodiment 4. Furthermore, the area corresponding to the position of the antinode of the traveling wave of the base plate 901 is formed of a material with smaller rigidity than other areas, and therefore it is possible to reduce rigidity of the base plate 901 and reduce the natural frequency of the vibrator. This makes it possible to achieve the same effects as those in Embodiment 7 and Embodiment 8.

Furthermore, the positions at which the columnar portions 903 are arranged on the base plate 901 and the vibration mode of the vibrator are the same as those explained in the first embodiment.

The present invention is not limited to the above embodiments and various changes and modifications can be made within the spirit and scope of the present invention. Therefore to apprise the public of the scope of the present invention, the following claims are made.

What is claimed is:

1. A vibration type driving apparatus comprising:
   a vibration body which generates vibration by supplying a driving signal to an electro-mechanical energy converting element; and
   a contact body which contacts the vibration body and is moved by vibration received from the vibration body, wherein the vibration body comprises a base portion having the electro-mechanical energy converting element and a plurality of vibration amplification portions for amplifying vibration generated at the base portion, and
   neighboring vibration amplification portions are connected at a position different from a connecting position of each vibration amplification portion with the base portion.

2. The vibration type driving apparatus according to claim 1, wherein vibration at the base portion is vibration which displaces some of the plurality of vibration amplification portions in a direction different from the moving direction of the contact body, and
   the plurality of vibration amplification portions are connected so as to transmit the displacement of each vibration amplification portion by vibration at the base portion.

3. The vibration type driving apparatus according to claim 1, wherein the vibration at the base portion is vibration whereby a wave appears along a line passing through the center of a plane substantially parallel to the moving plane of the contact body, and
   the plurality of vibration amplification portions are connected so as to transmit the displacement of each vibration amplification portion by vibration at the base portion.

4. The vibration type driving apparatus according to claim 1, wherein vibration at the base portion is a traveling wave generated by combining a plurality of standing waves which are generated in such a way that one node is formed at the same position.

5. The vibration type driving apparatus according to claim 1, wherein vibration generated at the vibration body is a primary traveling wave.

6. The vibration type driving apparatus according to claim 1, wherein each vibration amplification portion is located at a position that satisfies the following relationship on the base portion:

$$Z(r) \times dZ(r)/dr \geq 0,$$

where r is a distance from the center of the base portion to the vibration amplification portion and $Z(r)$ is an amount of displacement of the base portion in a direction perpendicular to a contact plane between the vibration body and the contact body.

7. The vibration type driving apparatus according to claim 4, wherein the plurality of vibration amplification portions are arranged at a position within a range of ¼ wavelength from the center of the base portion outward with respect to the node of the standing wave.

8. The vibration type driving apparatus according to claim 1, wherein the plurality of vibration amplification portions are arranged along a circumference of a circle centering on the center of the base portion.

9. The vibration type driving apparatus according to claim 1, wherein the plurality of vibration amplification portions are fixed to a fixed portion formed integrally with the vibration amplification portions.

10. The vibration type driving apparatus according to claim 1, wherein the plurality of vibration amplification portions are formed as a single piece.

11. The vibration type driving apparatus according to claim 1, wherein the base portion is structured in such a way that rigidity of an area located in an antinode of a standing wave is less than a rigidity of other areas.

12. The vibration type driving apparatus according to claim 1, wherein the base portion consists of only an electro-mechanical energy converting element.

13. The vibration type driving apparatus according to claim 1, wherein the respective amplification portions protrude from the base portion and have columnar shapes.

* * * * *

UNITED STATES PATENT AND TRADEMARK OFFICE
CERTIFICATE OF CORRECTION

PATENT NO.          : 7,034,438 B2
APPLICATION NO. : 10/725510
DATED                  : April 25, 2006
INVENTOR(S)         : Ohashi et al.

It is certified that error appears in the above-identified patent and that said Letters Patent is hereby corrected as shown below:

ON THE TITLE PAGE, AT ITEM (56) References Cited:
U.S. Patent Documents, "6,559,574 B1" should read --6,559,574 B2--.

COLUMN 1:
Line 29, "electromechanical" should read --electro-mechanical--.

COLUMN 4:
Line 28, "piezo electric" should read --piezoelectric--.
Line 63, "Dower" should read --power--.

COLUMN 7:
Line 43, "side)" should read --side).--.

COLUMN 11:
Line 40, After "Embodiment 1." a new heading --Embodiment 2-- should be inserted.

COLUMN 13:
Line 60, "steed" should read --speed--.

Signed and Sealed this

Seventeenth Day of July, 2007

JON W. DUDAS
*Director of the United States Patent and Trademark Office*